US010060382B2

(12) United States Patent
Glugla et al.

(10) Patent No.: US 10,060,382 B2
(45) Date of Patent: Aug. 28, 2018

(54) METHOD AND SYSTEM FOR PRE-IGNITION CONTROL

(71) Applicant: Ford Global Technologies, LLC, Dearborn, MI (US)

(72) Inventors: Chris Paul Glugla, Macomb, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 151 days.

(21) Appl. No.: 14/964,188

(22) Filed: Dec. 9, 2015

(65) Prior Publication Data

US 2017/0167424 A1    Jun. 15, 2017

(51) Int. Cl.
| F02D 41/00 | (2006.01) |
| F02D 41/30 | (2006.01) |
| F02D 41/14 | (2006.01) |
| F02D 41/40 | (2006.01) |
| F02D 35/02 | (2006.01) |
| F02P 9/00  | (2006.01) |

(52) U.S. Cl.
CPC ......... *F02D 41/3005* (2013.01); *F02D 35/02* (2013.01); *F02D 41/0062* (2013.01); *F02D 41/1448* (2013.01); *F02D 41/3023* (2013.01); *F02D 41/402* (2013.01); *F02D 41/006* (2013.01); *F02D 41/0087* (2013.01); *F02D 41/1446* (2013.01); *F02D 2200/021* (2013.01); *F02D 2200/024* (2013.01); *F02D 2250/14* (2013.01); *F02P 9/002* (2013.01); *Y02T 10/44* (2013.01); *Y02T 10/47* (2013.01)

(58) Field of Classification Search
CPC ... F02M 26/01; F02D 41/006; F02D 41/3005; F02D 41/0062; F02D 41/1448; F02D 41/3023; F02D 41/402; F02D 35/02
USPC ................................................... 123/568.14
See application file for complete search history.

(56) References Cited

U.S. PATENT DOCUMENTS

| 8,997,723 B2 | 4/2015 | Glugla et al. | |
| 9,043,122 B2 | 5/2015 | Glugla et al. | |
| 9,650,972 B2* | 5/2017 | Honda | F02D 41/0002 |
| 2003/0105575 A1* | 6/2003 | Haskara | F02D 41/0062 |
| | | | 701/101 |
| 2005/0235952 A1* | 10/2005 | Kuzuyama | F02D 13/0215 |
| | | | 123/305 |
| 2007/0023003 A1* | 2/2007 | Oechsle | F02D 41/3023 |
| | | | 123/299 |
| 2009/0194080 A1* | 8/2009 | Bression | F02B 25/145 |
| | | | 123/568.14 |
| 2014/0000557 A1* | 1/2014 | Glugla | F02D 41/008 |
| | | | 123/435 |

(Continued)

*Primary Examiner* — Sizo Vilakazi
(74) *Attorney, Agent, or Firm* — Julia Voutyras; McCoy Russell LLP (57) ABSTRACT

Methods and systems are provided for adjusting spark and/or fuel injection to a cylinder based on late combustion, partial burn, or misfire in a neighboring cylinder. A pressure sensor coupled to a cylinder exhaust port is used to sample exhaust pressure pulsations over a cylinder exhaust valve event, and accurately estimate an amount of residuals generated in and released from the cylinder as well as residuals received from the neighboring cylinder. Mitigating actions are performed in the cylinder in accordance before the occurrence of a pre-ignition event.

18 Claims, 5 Drawing Sheets

(56) References Cited

U.S. PATENT DOCUMENTS

| | | |
|---|---|---|
| 2015/0136080 A1 | 5/2015 | Surnilla |
| 2015/0167573 A1* | 6/2015 | Glugla ................. G01L 23/225 |
| | | 701/104 |
| 2016/0169142 A1* | 6/2016 | Klingbeil .............. F02D 19/061 |
| | | 123/435 |

* cited by examiner

METHOD AND SYSTEM FOR PRE-IGNITION CONTROL

FIELD

The present description relates generally to methods and systems for controlling a vehicle engine to reduce pre-ignition events.

BACKGROUND/SUMMARY

Under certain operating conditions, engine cylinders can misfire or have slow burns. These misfires or slow burns can increase hot residuals entering an adjacent cylinder during cam or valve overlap periods. When this happens, the hot residuals can cause the misfire to pre-ignite within the adjacent cylinder. The pre-ignition can generate very high in-cylinder pressures that can result in combustion pressure waves similar to combustion knock, but with larger intensity.

Also, in boosted engines, late burn combustion events wherein the combustion is later than intended can also lead to pre-ignition combustion events. Specifically, the late combustion can lead to high exhaust manifold pressures and temperatures, as well as higher than intended exhaust residuals. The elevated exhaust manifold pressures can overcome the exhaust valve spring pressure and potentially open exhaust valves on adjacent cylinders, filling the cylinder with hot exhaust gas residual and increasing the likelihood of pre-ignition in the adjacent cylinders. The issue may be exacerbated in small volume exhaust manifolds, such as may be used in turbocharged engine systems to minimize the time to torque. As such, pre-ignition events can reduce engine performance and cause engine degradation.

Various approaches have been developed to reduce such late-burn induced pre-ignition events. One example approach is shown by Glugla et al. in US20150167573. Therein, in response to a misfire event, or a late burn event in a first cylinder, a second neighboring cylinder that is most likely to receive the hot residuals from the first cylinder is determined. One or more pre-ignition mitigating actions are then preemptively performed in the second cylinder before pre-ignition is induced therein.

However the inventors herein have identified potential issues with such an approach. As an example, based on the actual location, magnitude, and timing of exhaust pressure peaks during the late burn, an identity of the cylinder getting the hot residuals may differ. For example, the approach of Glugla may rely on an average exhaust pressure to identify the cylinder receiving the residuals. However, due to the exhaust pressure pulsations, the instantaneous value of the exhaust pressure may be significantly different from the average pressure, resulting in errors in identifying the residual receiving cylinder. Still other variables such as engine speed, spark timing, and valve timing events can affect the transport delay incurred between the generation and release of the hot residuals from a first cylinder and unintended receipt of the hot residuals in a second cylinder. As another example, the approach of Glugla may apply a more aggressive pre-ignition mitigating action (such as higher degree of richness of a pre-ignition mitigating enrichment, or a longer duration of enrichment) on the second cylinder than is warranted based on the amount of residuals actually received in the cylinder. As a result, fuel economy may be degraded.

The inventors herein have recognized that by determining an exhaust pressure profile for each cylinder by sampling cylinder exhaust pressure during an exhaust valve event of the cylinder, it may be possible to more accurately identify when and where residuals are being released, how much and how hot the residuals are, and which cylinders are going to be affected by those residuals. In one example, the above issues may be at least partly addressed by a method for addressing pre-ignition in an engine comprising: indicating imminent pre-ignition in a cylinder responsive to an amount of residuals received or generated in the cylinder, the amount of residuals based on exhaust pressure and intake manifold pressure; and adjusting fueling of the cylinder based on the indication and further based on the amount of residuals. In this way, misfire and late burn induced pre-ignition events may be reduced.

As an example, an exhaust pressure profile may be determined for each cylinder by sampling an exhaust pressure (estimated at an exhaust port) of each cylinder during corresponding exhaust valve events. The profile may include instantaneous exhaust pressure estimates for each point over the exhaust valve event, as well as a peak exhaust pressure, and an average exhaust pressure. Based on the exhaust pressure profile of each cylinder, an engine controller may determine whether a cylinder misfire event or a late burn event has occurred. In addition, the controller may determine an amount, location, and temperature of residuals released from the misfiring/late-burning cylinder by comparing the exhaust pressure to the intake manifold pressure. Based on the engine configuration, cylinder firing order, and valve timing of each cylinder, a cylinder that is likely to receive the residuals may be identified. Then, based on the amount and temperature of residuals released, the controller may further confirm whether the residuals will be received in the identified cylinder (such as by comparing the force generated by the residuals to the force of a spring holding down a valve seat). If residuals are received, responsive to the temperature and amount of the received residuals, a pre-ignition mitigating action to be performed in the identified cylinder may be adjusted. In addition, an internal EGR estimate in the residual releasing and receiving cylinders may be updated, allowing for cylinder operating parameters such as spark timing and external EGR to be correspondingly adjusted.

In this way, by estimating exhaust pressure pulsations in each engine cylinder, an amount of exhaust residuals released from a cylinder, and received in another cylinder, may be more accurately determined. The technical effect of relying on instantaneous and peak exhaust pressure estimates over a cylinder exhaust valve event, rather than an average exhaust pressure, is that a higher signal to noise ratio may be provided, improving the identification of misfiring or late-burning cylinders, as well as other cylinders affected by the residuals released from the misfiring or late-burning cylinders. By performing a pre-ignition mitigating adjustment in the cylinder identified as receiving the residuals, late-burn/misfire induced pre-ignition may be better addressed. The technical effect of adjusting fuel and/or spark in the affected cylinder based on the amount and temperature of residuals received therein is that pre-ignition may be addressed without degrading fuel economy. In particular, the fuel and spark adjustment may be more accurately matched to the degree of pre-ignition anticipated based on the residuals. Further still, by relying on the exhaust pressure profile for misfire detection, there may be fewer false positive indications of misfire. Overall, engine degradation due to misfire and late-burn induced pre-ignition can be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for detecting delivery of hot residuals in a cylinder responsive to late combustion or misfire in a neighboring cylinder and adjusting spark and/or fuel injection to the affected cylinder so as to reduce late burn or misfire induced pre-ignition events. In engines configured with small exhaust manifolds, such as the engine systems of FIG. 1, exhaust residuals from a late combustion event in a first cylinder can raise exhaust manifold pressures such that the residuals are forcibly received in a second, neighboring cylinder. An engine controller may be configured to monitor the exhaust pressure of each cylinder over an exhaust valve event, as determined based on valve timing (FIGS. 2-3), to determine corresponding exhaust pressure profiles, as shown at FIG. 4. Based on the exhaust pressure profile, the controller may perform a control routine, such as the example routine of FIG. 5, to identify an amount and temperature of residuals generated and released from a first misfiring/late-burning cylinder, as well as an amount and temperature of residuals received at a second, neighboring cylinder. The controller may also adjust spark and/or fuel injection to the second cylinder commensurate with the amount and temperature of residuals received in the second cylinder, as also determined based on the exhaust pressure profile. Example residual profiles and fuel injection adjustments are described with reference to FIG. 6. In this way, engine degradation from pre-ignition events may be reduced.

Figure 1:
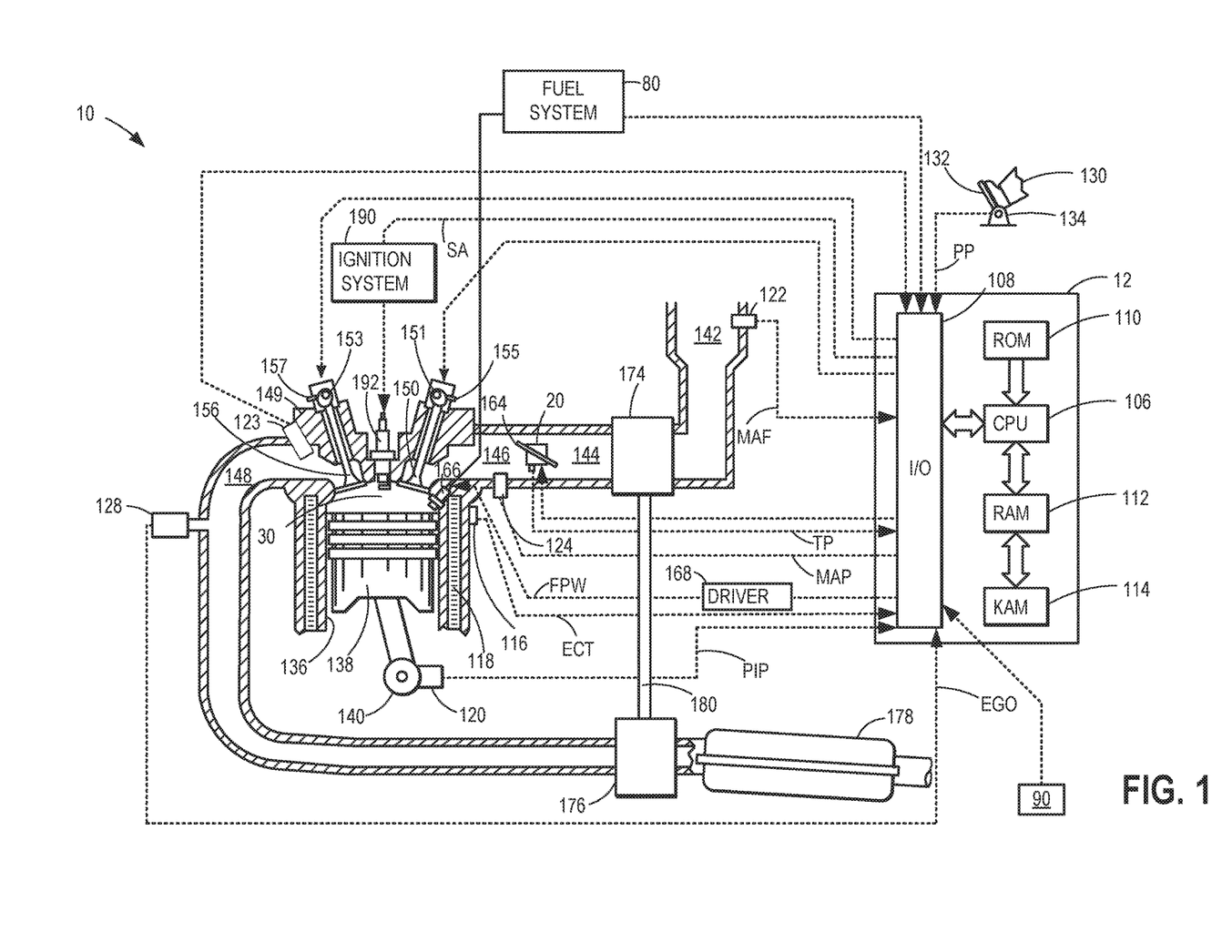
FIG. 1 shows a schematic diagram of an internal combustion engine.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Combustion chamber (i.e. cylinder) 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of a vehicle via an intermediate transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 30. In one example, exhaust passage 148 may receive exhaust from all the cylinders of engine 10. However, in some embodiments, the exhaust from one or more cylinders may be routed to a first exhaust passage, while the exhaust from one or more other (remaining) cylinders may be routed to a second, different exhaust passage, the distinct exhaust passages then converging further downstream, at or beyond an exhaust emission control device. Exhaust gas sensor 128 is shown coupled to exhaust passage 148 upstream of emission control device 178.

Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. As discussed herein, in response to residuals generated due to late combustion or misfire in a first cylinder, ignition spark may be disabled in a second neighboring cylinder receiving the exhaust residuals from the first cylinder in order to pre-empt imminent pre-ignition in the second cylinder.

Exhaust pressure sensor 123 is positioned in an exhaust passage or port where exhaust gas exits cylinder 30. Exhaust pressure sensor 123 may be positioned within cylinder head 149 or in exhaust manifold 148. In one example embodiment, such as where the engine is configured for recirculating high pressure EGR from the exhaust to the engine intake, exhaust pressure sensor 123 may be used for measuring an amount of high pressure EGR being recirculated. In another example, exhaust pressure sensor 123 may be used for inferring the loading of a downstream emission control device, such as a downstream gasoline particulate filter. As elaborated herein, exhaust pressure sensor 123 may also be used to sample exhaust pressure for a cylinder over a valve event, and infer an amount of residuals generated and released from the cylinder, as well as received in the cylinder from a misfiring or late-burning cylinder.

In one example, where a common exhaust manifold is shared by all the cylinders, a single exhaust pressure sensor 123 may be located in the exhaust manifold in a position that has adequate signal-to-noise ratio from all cylinders. In other examples, such as where the engine includes bifurcated or divided exhaust manifolds (such as those on twin scroll turbocharged engine systems), an exhaust pressure sensor 123 may be coupled in each separate exhaust path, and may be configured to estimate exhaust residuals from/to only the cylinders in communication with that given exhaust branch or path. In still other examples, an exhaust pressure sensor 123 may be coupled per cylinder, thereby offering the advantage of a higher signal-to-noise ratio, and less transport delay time.

In some embodiments, each cylinder of engine 10 may be configured with one or more fuel injectors for providing fuel thereto. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. It will be appreciated that, in an alternate embodiment, injector 166 may be a port injector providing fuel into the intake port upstream of cylinder 30.

It will be appreciated that in still further embodiments, the engine may be operated by injecting a variable fuel blend or knock/pre-ignition suppressing fluid via two injectors (a direct injector 166 and a port injector) and varying a relative amount of injection from each injector.

Fuel may be delivered to fuel injector 166 via a high pressure fuel system 80, including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12.

Fuel may be delivered by the injector(s) to the cylinder during a single engine cycle of the cylinder. Further, the distribution and/or relative amount of fuel delivered from the injector(s) may vary with operating conditions. For example, the distribution may vary with a rate of change of a cylinder aircharge, a nature of an abnormal cylinder combustion event (such as, whether there is a cylinder misfire event, knock event, or pre-ignition event). Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel tanks in fuel system 80 may hold fuel or knock/pre-ignition suppressing fluids with different qualities, such as different compositions. These differences may include different alcohol content, different water content, different octane, different heat of vaporizations, different fuel blends, and/or combinations thereof etc. In one example, fuels or knock/pre-ignition suppressing fluids with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline etc. In still another example, both fuels may be alcohol blends wherein the first fuel may be a gasoline alcohol blend with a lower ratio of alcohol than a gasoline alcohol blend of a second fuel with a greater ratio of alcohol, such as E10 (which is approximately 10% ethanol) as a first fuel and E85 (which is approximately 85% ethanol) as a second fuel. In yet another example, one of the fluids may include water while the other fluid is gasoline or an alcohol blend. Additionally, the first and second fuels may also differ in other fuel qualities such as a difference in temperature, viscosity, octane number, latent enthalpy of vaporization etc. Still other pre-ignition suppressing fluids may include water, methanol, washer fluid (which is a mixture of approximately 60% water and 40% methanol), etc.

Moreover, fuel characteristics of the fuel or pre-ignition suppressing fluid stored in the fuel tank may vary frequently. In one example, a driver may refill the fuel tank with E85 one day, and E10 the next, and E50 the next. The day to day variations in tank refilling can thus result in frequently varying fuel compositions, thereby affecting the fuel composition delivered by injector 166.

Engine 10 may further include one (as depicted) or more knock sensors 90 distributed along a body of the engine (e.g., along an engine block). When included, the plurality of knock sensors may be distributed symmetrically or asymmetrically along the engine block. Knock sensor 90 may be an accelerometer, an ionization sensor, or a vibration sensor. In one example, the controller 12 may be configured to detect and differentiate engine block vibrations generated due to abnormal combustion events, such as knocking and pre-ignition, from the forced opening (and subsequent slamming shut) of a cylinder exhaust valve based on the output (e.g., signal timing, amplitude, intensity, frequency, etc.) of the one or more knock sensors 90. The controller may assess the sensor outputs in different timing windows that are cylinder specific and that are based on the nature of the vibration being detected. For example, vibrations generated due to the forced opening of a cylinder exhaust valve by exhaust residuals released from a late burning cylinder may be identified by knock sensor outputs sensed in a window that is relatively later during an open exhaust valve event of the late burning cylinder. In comparison, abnormal cylinder combustion events occurring in a firing cylinder may be identified by knock sensor outputs sensed in a window that is relatively earlier during an open exhaust valve event of the late burning cylinder. In one example, the windows in which the knock signals are estimated may be crank angle windows.

In further examples, the controller 12 may be configured to detect and differentiate the origin of the vibrations based on the output (e.g., signal timing, amplitude, intensity, frequency, etc.) of the one or more knock sensors as well as a rate of change of a parameter indicative of a cylinder aircharge such as a rate of change of a manifold pressure (MAP), a manifold air flow (MAF), etc.

It will be appreciated that while FIG. 1 suggests using knock sensors to sense engine block vibrations and forced entry of exhaust residuals into a cylinder, in alternate examples, other accelerometers, vibrations sensors, or in-cylinder pressure sensors can be used to sense the vibrations. Further, the accelerometers, vibrations sensors, in-cylinder pressure sensors, and ionization sensors may also be used to indicate a cylinder misfire event and distinguish the misfire event from knock or pre-ignition events.

A cylinder misfire event or late burn event may also be indicated based on engine speed fluctuations and/or cylinder exhaust port pressure pulsations sensed by a pressure sensor, such as pressure sensor 123. In particular, exhaust pressure pulsations may be sampled for each engine cylinder over an exhaust valve event (and not during other timings) by cylinder-specific exhaust port pressure sensors. Based on the resulting exhaust pressure profile for each cylinder (including an instantaneous exhaust pressure, a peak pressure, and an average exhaust pressure over the valve event), and further based on cylinder valve timing, a controller may estimate an amount and temperature of residuals generated in each cylinder. By comparing the force of the generated residuals to a force of a valve spring holding an exhaust valve on the valve seat, the controller may further determine if the generated residuals are likely to force open a closed exhaust valve of the cylinder, and if so, the amount of residuals released as well as a cylinder most likely to receive those residuals. For example, a second cylinder with an open intake valve may receive the residuals from a first cylinder where the exhaust valve is forced open. In addition, based on the exhaust pressure profile, the controller may determine a temperature of residuals received in the second cylinder, and adjust spark and/or fuel to the second cylinder to pre-empt imminent pre-ignition incurred due to the received residuals.

During engine operation, each cylinder within engine 10 typically undergoes a four stroke cycle: the cycle includes the intake stroke, compression stroke, expansion stroke, and exhaust stroke. During the intake stroke, generally, the exhaust valve 156 closes and intake valve 150 opens. Air is introduced into combustion chamber 30 via intake manifold 144, and piston 138 moves to the bottom of the cylinder so as to increase the volume within combustion chamber 30. The position at which piston 138 is near the bottom of the cylinder and at the end of its stroke (e.g. when combustion chamber 30 is at its largest volume) is typically referred to by those of skill in the art as bottom dead center (BDC). During the compression stroke, intake valve 150 and exhaust valve 156 are closed. Piston 138 moves toward the cylinder head so as to compress the air within combustion chamber 30. The point at which piston 138 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 192, resulting in combustion. During the expansion stroke, the expanding gases push piston 138 back to BDC. Crankshaft 140 converts piston movement into a rotational torque of the rotary shaft. Finally, during the exhaust stroke, the exhaust valve 156 opens to release the combusted air-fuel mixture to exhaust manifold 148 and the piston returns to TDC. Note that the above is shown merely as an example, and that intake and exhaust valve opening and/or closing timings may vary, such as to provide positive or negative valve overlap, late intake valve closing, or various other examples.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; exhaust port pressure sensor 123, engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor 90 and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold. Still other sensors such as cylinder pressure sensors, knock sensors, and/or pre-ignition sensors may be coupled to engine 10 (e.g., to a body of the engine) to help in the identification of abnormal combustion events. The controller 12 receives signals from the various sensors of FIG. 1 and employs the various actuators of FIG. 1 to adjust engine operation based on the received signals and instructions stored on a memory of the controller. For example, the controller may adjust ignition spark timing and/or a pulse width of a fuel injector based on a cylinder exhaust residual profile, as estimated based on the output of exhaust port pressure sensor 123.

Storage medium read-only memory 110 can be programmed with computer readable data representing instructions executable by processor 106 for performing the methods described below as well as other variants that are anticipated but not specifically listed.

Figure 2:
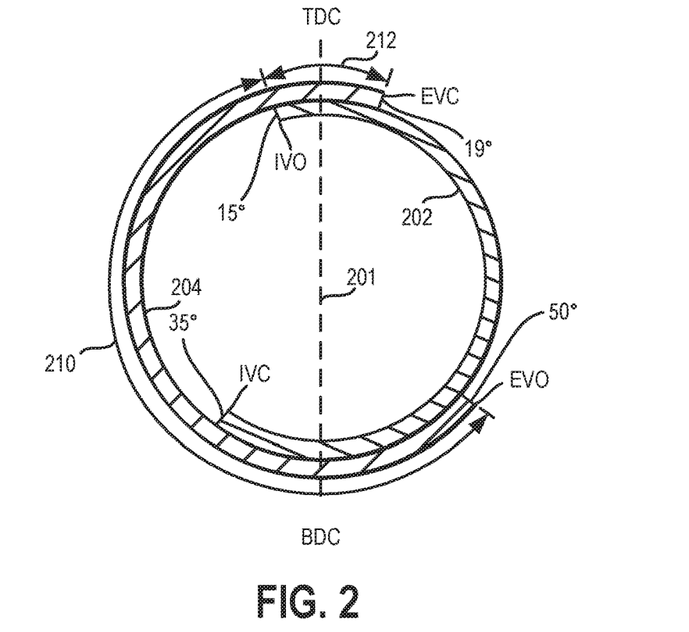
FIGS. 2-3 show different example valve timings for a cylinder.

Referring now to FIG. 2, a first circular valve timing diagram that illustrates exhaust pressure sampling timing is shown. The valve timings shown in FIG. 2 may be implemented in the system of FIG. 1, and the illustrated sampling times are according to the method of FIG. 5.

Inner ring 202 represents prophetic intake valve opening timing for the four stroke engine shown in FIG. 1. Outer ring 204 represents prophetic exhaust valve opening timing for the four stroke engine shown in FIG. 1. Top-dead-center (TDC) compression and exhaust positions are indicated at the top of vertical line 201. Likewise, bottom-dead-center (BDC) intake and expansion positions are indicated at the bottom of vertical line 201. Intake valve opening is denoted IVO, intake valve closing is denote IVC, exhaust valve opening is denoted EVO, and exhaust valve closing is denoted EVC. Thus, IVO occurs during the exhaust stroke and the intake valve remains open through the intake stroke until the early portion of the compression stroke. EVO occurs during the expansion stroke and the exhaust valve remains open until the early portion of the intake stroke. In this example, EVO is 50° before BDC exhaust stroke and EVC is 19° after TDC exhaust stroke. IVO is 15° before TDC intake stroke and IVC is 35° after BDC intake stroke, where degrees are crankshaft degrees.

Figure 5:
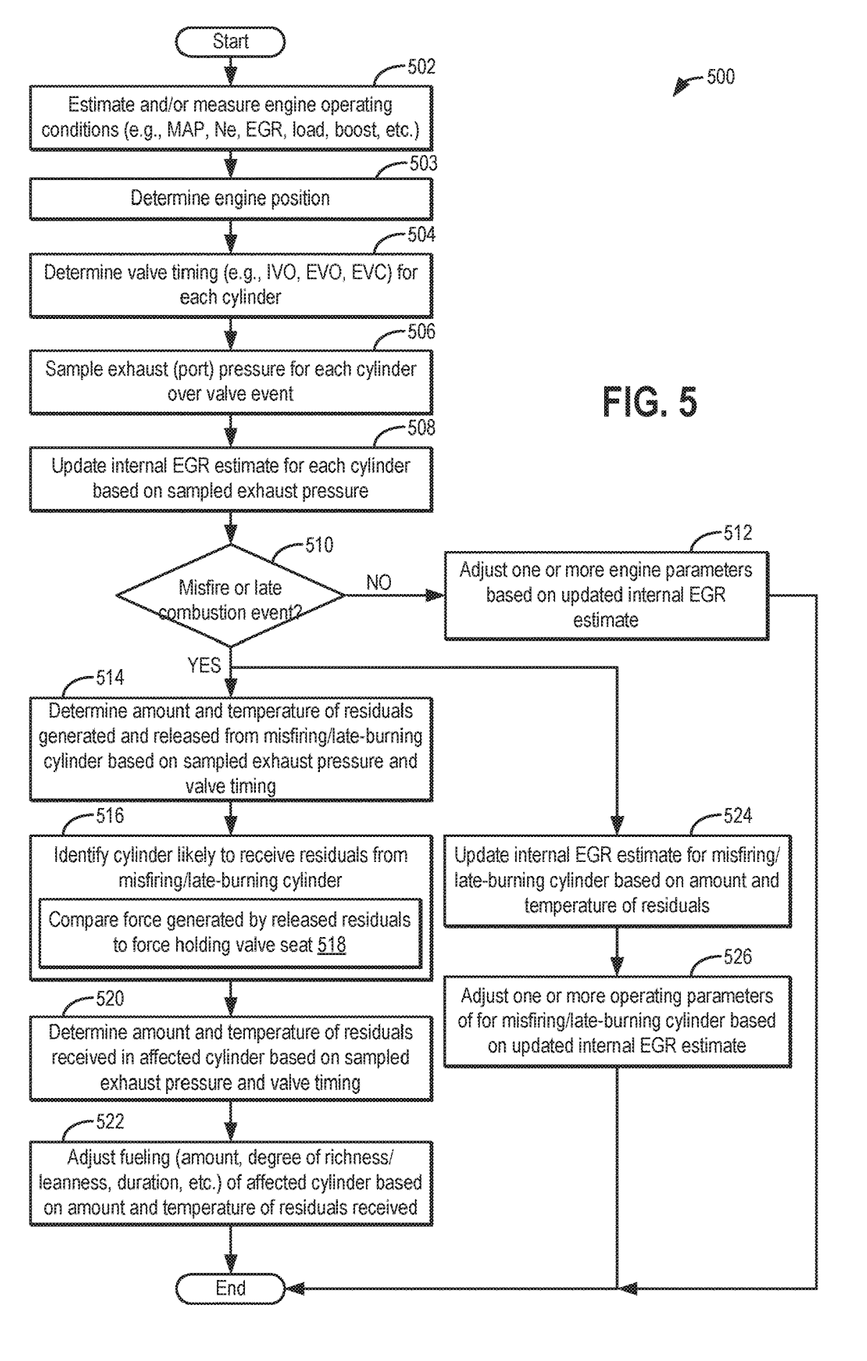
FIG. 5 shows a high level flow chart of an example method for identifying, based on an exhaust pressure profile, the release of residuals from a misfiring cylinder and the receiving of residuals in a neighboring cylinder.

According to the method of FIG. 5, the exhaust pressure sensor located in the exhaust port of a cylinder may be sampled during the time when the exhaust valve is open. In FIG. 2, the exhaust valve is open for duration 210 and duration 212. However, in some examples, exhaust pressure may not be sampled during intake and exhaust valve opening overlap period 212. During intake and exhaust valve overlap, exhaust pressure may rise if intake manifold pressure is greater than exhaust pressure. Thus, exhaust pressure may be influenced by the positive intake manifold pressure. The exhaust pressure sampling may be based on crankshaft position or time since the exhaust valve opened. If the sampling is crankshaft position based, exhaust pressure samples may be taken a predetermined number of crankshaft degrees apart. Alternatively, exhaust samples may be taken during duration 212 and then discarded or not used to determine integrated or peak exhaust pressures. Thus, in this example, exhaust pressure sensor sampling may be between 50° before BDC exhaust stroke and 19° after TDC exhaust stroke. Alternatively, in this example, exhaust pressure sensor sampling may be between 50° before BDC exhaust stroke and 15° before TDC intake stroke.

Figure 3:
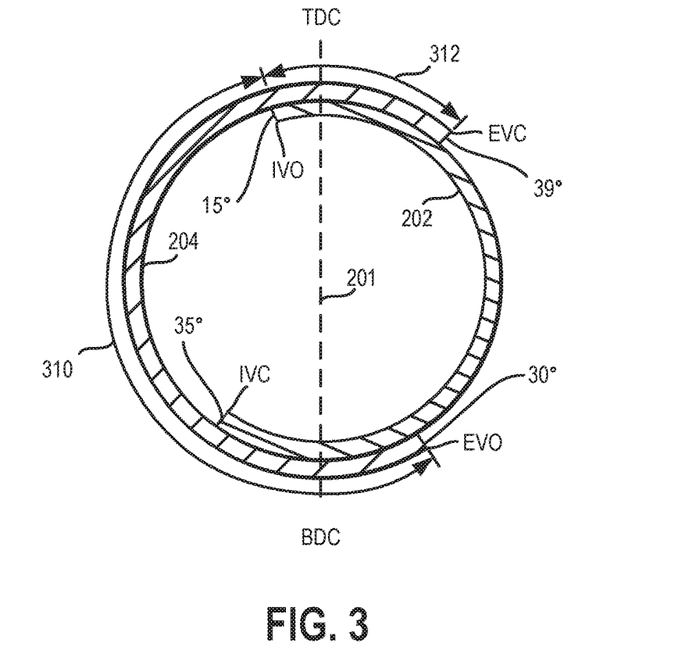
Figure 4:
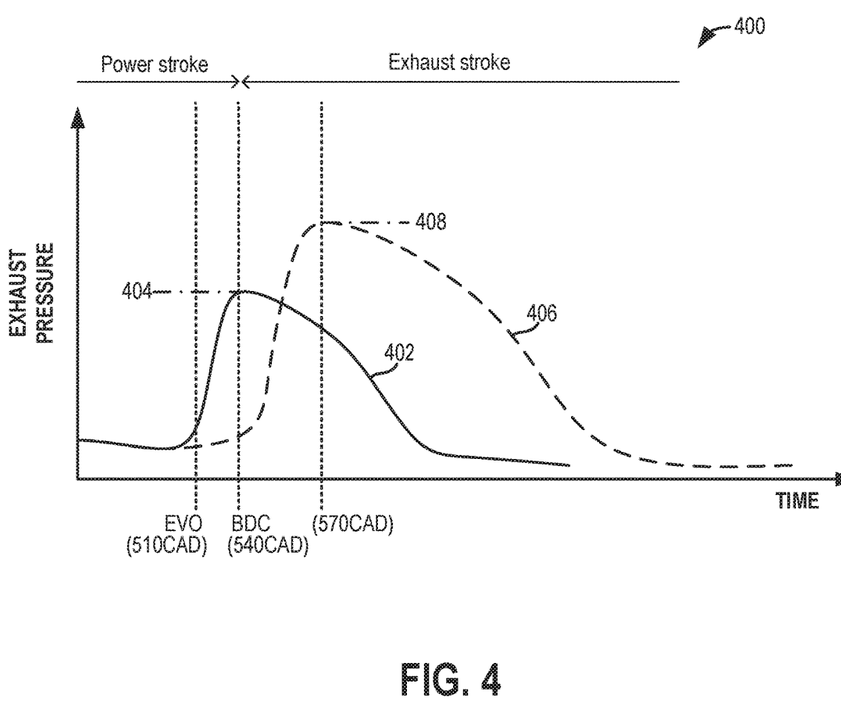
FIG. 4 shows an example prophetic cylinder exhaust pressure.

Referring now to FIG. 3, a second circular valve timing diagram that illustrates exhaust pressure sampling timing is shown. The valve timings shown in FIG. 3 may be implemented in the system of FIG. 1, and the illustrated sampling times are according to the method of FIG. 5. The inner 202 and outer 204 rings represent the same intake and exhaust valves as described in FIG. 2. However, in the second example of FIG. 3, exhaust valve timing has been retarded by 20° so that EVO is 30° before BDC exhaust stroke and EVC is 39° after TDC exhaust stroke. Additionally, the intake valve opening and exhaust valve opening overlap time is increased due to the exhaust valve timing retard. In particular, the overlap duration is increased from 34° to 54°. According to the method of FIG. 5, exhaust pressure may be sampled during duration 310 of FIG. 3. Further, exhaust pressure may be sampled or sampling may be ceased during duration 312 according to the method of FIG. 5. Therefore, in examples where sampling is ceased during overlap periods, the exhaust pressure sampling duration is reduced from a sampling window of 215° to 195° between the exhaust pressure sampling window (e.g., 210 and 212) shown in FIG. 2 and the exhaust pressure sampling window (e.g., 310 and 312) shown in FIG. 3. By adjusting the exhaust pressure sampling window, an exhaust pressure profile may be created that is more accurately reflective of residuals generated and/or released due to a cylinder late burn. As a result, misfires incurred due to a late burn, as well as pre-ignition incurred due to the late burn or misfire event can be more reliably predicted and timely addressed.

Referring now to FIG. 4, a plot of prophetic exhaust pressures is shown. The plot includes a vertical Y axis and a horizontal X axis. The Y axis represents exhaust pressure for a cylinder as estimated by a pressure sensor coupled to the exhaust port of the cylinder (such as pressure sensor 123 of FIG. 1). Exhaust pressure increases positively in the direction of the arrow above the X axis. Exhaust pressure increases negatively in the direction of the arrow below the X axis. The X axis represents time and time increases from the left side of the plot to the right side of the plot.

Solid trace 402 represents an exhaust pressure profile for a cylinder that has not misfired. The pressure profile starts during the power/expansion stroke of the cylinder and ends in the exhaust stroke. The pressure profile includes a peak pressure 404. As can be seen, the exhaust pressure starts to rise at exhaust valve opening (EVO) due to a blow-down effect. The pressure peaks soon after EVO (around 510CAD) and then starts to fall off by the time the exhaust valve event is completed. Additionally, an integral of trace 402 may be used to determine the amount of residuals generated in the cylinder.

As such, a misfiring cylinder may be distinguished from a non-misfiring cylinder by comparing the peak pressure (a lower peak pressure may be observed for the misfiring cylinder while a higher peak pressure may be observed for a late combusting cylinder) and/or the integral of exhaust pressure measured during exhaust valve opening (a lower integral amount may be observed for the misfiring cylinder while a higher integral amount may be observed for a late burning cylinder).

Dashed trace 406 represents an exhaust pressure profile for the same cylinder that has incurred a late combustion. The pressure profile starts at BDC, during a transition from the power/expansion stroke of the cylinder to the exhaust stroke. The pressure profile includes a peak pressure 408 that is higher than peak pressure 404 observed with normal cylinder combustion. As can be seen, the exhaust pressure starts to rise when the exhaust valve opens delayed at BDC (540CAD). The pressure peaks soon after (around 570CAD) and then starts to fall off by the time the exhaust valve event is completed. Additionally, an integral of trace 406 may be used to determine the larger amount of hotter residuals generated in the late burning cylinder.

Turning now to FIG. 5, an example method 500 is depicted for estimating an exhaust pressure profile for each engine cylinder during corresponding exhaust valve events. The method further indicates imminent pre-ignition in a cylinder responsive to an amount of residuals received or generated in the cylinder, the amount of residuals based on the estimated exhaust pressure, and adjusts fueling of the cylinder based on the indication and further based on the amount of residuals. Instructions for carrying out method 500 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 502, method 500 includes estimating and/or measuring engine operating conditions. The estimated parameters may include, for example, engine speed and load, manifold pressure, driver torque demand, EGR, boost pressure, etc. At 503, method 500 determines engine position. In one example, engine position is determined via a crankshaft position sensor and a camshaft position sensor. The combination of crankshaft and camshaft position sensor allows the controller to determine where TDC cylinder number one compression stroke is as well as the strokes for the remaining engine cylinders. For example, the crankshaft position sensor may sense 59 teeth of a position wheel during one engine revolution. The cam sensor may output one pulse for three hundred and sixty degrees of crankshaft rotation for every two engine revolutions. The crankshaft teeth and the cam sensor pulse allow individual identification of positions of all engine cylinders. In other examples, the number of crankshaft teeth and camshaft pulses may be adjusted to allow faster identification of engine position. The engine position is updated as the engine rotates. Method 500 proceeds to 504 after engine position is determined.

At 504, the method includes determining valve timing for each cylinder. For example, each of intake valve opening (IVO) timing, exhaust valve opening timing (EVO), and exhaust valve closing (EVC) timing may be determined for each engine cylinder. In one example, method 500 indexes lookup tables or functions that output IVO, EVO, and EVC based on camshaft position relative to crankshaft position. Therein, camshaft position and crankshaft position index the tables and/or functions and IVO, EVO, and EVC are output. Method 500 proceeds to 508 after IVO, EVO, and EVC are determined.

At 506, the method includes sampling an exhaust pressure for each cylinder. In one example, the exhaust pressure for each cylinder is sampled during a corresponding cylinder valve event. Therein, an exhaust pressure may be sampled for each cylinder by pressure sensor (such as sensor 123 of FIG. 1) coupled to an exhaust port of the cylinder over an exhaust valve event of the cylinder. In another example, the exhaust pressure for each cylinder is constantly and periodically sampled by exhaust pressure sensor 123, such as at a rate of 1-2 ms. The sampling interval may be further adjusted in response to the detection of a late burn or misfire event, as discussed below. Further still, a crankshaft position sensor may also be concurrently sampled at a similar rate, and the crankshaft data can be aligned with the exhaust pressure data to align the exhaust pulses with combustion timing while accounting for transport delay times. The resulting exhaust pressure profile generated for each cylinder may include instantaneous exhaust pressure values (such as instantaneous exhaust pressure values at each point of the valve event), as well as a peak pressure and an average pressure. In addition, the integral of the pressure profile may be used to estimate the amount of residuals generated in, and/or released from the cylinder. In some examples, in addition to sampling the exhaust pressure, intake manifold pressure changes may also be monitored continually or over the cylinder valve event.

At 508, the method includes updating an internal EGR estimate for each cylinder based on the sampled exhaust pressure. For example, based on the sampled exhaust pressure, an amount of residuals generated in the cylinder may be determined. In one example, the amount of residuals generated in the cylinder may be determined based on the sampled exhaust pressure relative to the sampled intake manifold pressure. Therein, an estimated amount of residuals may be increased as the exhaust pressure exceeds the intake manifold pressure. Then, further based on the cylinder valve timing, an amount of residuals retained in the cylinder and released from the cylinder may be determined. Alternatively, by comparing an instantaneous exhaust pressure estimate to an instantaneous manifold pressure estimate, an amount of residuals generated in the cylinder may be determined. In addition to the amount or degree of residuals generated in the cylinder, a temperature of the residuals may also be determined based on the sampled exhaust pressure and further based on the valve timing. Based on the net amount of residuals retained in a cylinder, an internal EGR estimate for the cylinder may be updated. For example, the net amount of residuals may be estimated based on a difference between the intake manifold pressure (MAP) and the exhaust manifold pressure, such as by integrating the difference of [exhaust manifold pressure—MAP]. The temperature of the residuals may be estimated as the average temperature measured at the exhaust port.

At 510, it may be determined if there is a misfire event or a late combustion event in an engine cylinder. In one example, the presence of a misfire event may be confirmed based on the sampled exhaust pressure of each cylinder over the valve event. In particular, as discussed with reference to FIG. 4, a misfiring cylinder may be identified based on a lower than a threshold peak pressure and/or a lower than threshold pressure integral. In another example, a late burn event may be identified based on the position of a peak pressure of the exhaust pressure profile being retarded from an expected timing.

In still another example, a cylinder misfire (or partial burn) may be identified based on crankshaft acceleration. Further still, the cylinder misfire may be identified based on an exhaust air-fuel ratio, for example, based on the output of an exhaust gas oxygen sensor (e.g., UEGO sensor). In still another example, the cylinder misfire may be identified based on spark plug ionization (e.g., ionization current) as determined by an ionization sensor coupled to the spark plug. For example, during misfire events, an exhaust oxygen sensor may read lean if there is a misfire/partial burn due to the presence of excess oxygen in the exhaust that was not consumed during the combustion process. Thus, a misfire may be indicated based on the output of the exhaust gas oxygen sensor being leaner than a threshold. In still other examples, a misfire may be determined based on changes in in-cylinder pressure as estimated by an in-cylinder pressure sensor.

Likewise, the presence of a late burn event may be confirmed based on the sampled exhaust pressure of each cylinder over the valve event. In particular, a late burning cylinder may be identified based on one or more of a position or location of the threshold peak pressure, the peak pressure (e.g., absolute pressure value), and an integral of the pressure in the sampled pressure profile over a window related to the exhaust valve event, taking into account the transport delay time. In other examples, a late combustion event in a first cylinder may be inferred based on one or more of the cylinder's (intake and/or exhaust) valve timing, spark timing, spark plug ionization current, crankshaft acceleration, exhaust temperature, and cylinder pressure. For example, a late combustion may be determined in response to a combustion timing of the cylinder being retarded from a threshold timing. The threshold timing may be based on a location of peak pressure during the combustion event in the first cylinder. As another example, the threshold timing may be based on a location where a threshold mass fraction of burned fuel remains in the first cylinder. As an example, the threshold timing may include a timing that results in 50% mass fraction being burned at locations later than 35 degrees after TDC. This may include an intake and/or exhaust valve timing of combustion in the first cylinder being retarded from a threshold valve timing and/or a spark timing of combustion in the first cylinder being retarded from a threshold spark timing (e.g., from MBT).

If neither a cylinder misfire event nor a late combustion event is confirmed, then at 512, the method includes adjusting one or more engine operating parameters based on the updated internal EGR estimate. In particular, after the internal EGR estimate of a cylinder is updated (at 508), one or more parameters that may be affected by a change in the internal EGR estimate may be adjusted at 512. For example, the controller may update one or more of an engine external EGR estimate, spark timing, rate of change of spark timing, and engine fueling based on the updated internal EGR estimate. As non-limiting examples, in response to an increase in cylinder internal EGR, an engine external EGR amount may be decreased (e.g., by decreasing the opening of an EGR valve), spark timing may be adjusted so that spark advance is retarded relative to the spark advance applied in the presence of a higher residual amount, spark energy may be decreased if the engine dilution is lower than a threshold by decreasing an ignition coil dwell time, and cylinder fueling may be adjusted (e.g., increased if more air enters the cylinder when EGR is reduced), if required, to maintain a stoichiometric air-fuel ratio (e.g., the cylinder may be operated leaner than stoichiometry).

If a cylinder misfire event or late burn event is confirmed, then at 514, the method includes determining the amount and temperature of residuals generated and released from the misfiring or late-burning cylinder based on the sampled exhaust pressure and further based on the valve timing. For example, the engine controller may determine an amount of residuals released from the misfiring or late-burning cylinder into the exhaust manifold based on the instantaneous exhaust pressure in the cylinder at EVO. Alternatively, the amount of residuals may be estimated based on a difference (such as an integrated difference over a valve event) between the estimated exhaust manifold pressure and the intake manifold pressure (MAP).

At 516, the method includes identifying a cylinder that is most likely to receive exhaust residuals from the misfiring or late-burning cylinder. For example, the controller may use a transport delay time to determine a time and location of release of a peak pressure of the exhaust residuals from the misfiring/late-burning cylinder. Applicants have recognized that a late combustion can lead to high exhaust manifold pressures and temperatures, as well as higher than intended exhaust residuals (both in terms of amount and temperature). The elevated exhaust manifold pressures due to the release of the hot residuals can overcome the exhaust valve spring pressure and potentially open exhaust valves on adjacent cylinders, filling the cylinder with hot exhaust gas residual and increasing the likelihood of pre-ignition in the adjacent cylinders (that is, the cylinders that received residuals due to a valve being forced open). The issue may be exacerbated in small volume exhaust manifolds, such as may be used in turbocharged engine systems to minimize the time to torque. Thus identifying a cylinder most likely to be forced open and most likely to receive unintended hot residuals from a misfiring/late-burning cylinder may include, at 518, comparing the force generated by the residuals released from the misfiring or late-burning cylinder into the exhaust manifold with a force holding the exhaust valve of other cylinders at the valve seat. In addition, the force generated by the residuals within each cylinder may also be taken into account. If the force generated by the residuals released from a first misfiring or late-burning cylinder is higher than the force holding the exhaust valve of a second cylinder at the valve seat, the controller may infer that the exhaust valve of the second cylinder may be forced open, resulting in residuals from the first cylinder being forced into the second cylinder. By relying on the sampled pressure profiles of individual cylinders to infer the identity of cylinder exhaust valves that are forced open during a cylinder misfire or late burn event, imminent late-burn or misfire induced pre-ignition may be more accurately predicted and timely addressed.

In another example, the controller may predict that an exhaust valve can be forced off the seat by determining if the exhaust cam is on a base circle. Then, from the crank angle and air charge estimate, and further based on the position of a piston in the cylinder, the cylinder pressure can be estimated. If the exhaust pressure is greater than the cylinder pressure, the controller may infer that the exhaust valve of the cylinder may be forced off the seat.

In alternate examples, determining which cylinder is receiving exhaust residuals from the late burning or misfiring event in the first cylinder may include inferring (or identifying) a second cylinder (Cylinder_2) based at least on an identity of the first cylinder and a firing order of the engine. For example, in a four cylinder in-line engine having consecutively positioned cylinders numbered 1 through 4, and wherein a firing order of the cylinders includes cylinder number 1 firing first, followed by cylinder number 3, then cylinder number 4 and finally cylinder number 2, it may be determined which of cylinders 1-4 incurred the late combustion to identify which cylinder will most likely receive the hot exhaust residuals. Herein, if cylinder number 1 is the first cylinder incurring the late combustion, cylinder number 2 is most likely to receive the exhaust residuals since cylinder number 2 will be in an intake stroke (providing least resistance to the entry of residuals) when cylinder number 1 is in the exhaust stroke, while the other cylinders will be in power or compression strokes (providing higher resistance to the entry of residuals). However, if cylinder number 4 is the first cylinder incurring the late combustion, cylinder number 3 will most likely receive the exhaust residuals since cylinder number 3 will be in an intake stroke (providing least resistance to the entry of residuals) when cylinder number 4 is in the exhaust stroke. As such, the identity of the cylinder receiving residuals would be different if the engine was a 6-cylinder in-line engine, or if the engine was a four cylinder V-shaped engine with different cylinders of different engine banks. In one example, where the engine has different groups of cylinders on different banks, the first cylinder undergoing the late combustion and the second cylinder receiving the exhaust residuals may be located on a common engine bank.

In some embodiments, the second cylinder may be further identified based on an exhaust manifold configuration. For example, the identity of the second cylinder may be based on whether the exhaust manifold was integrated or segmented. As an example, if the exhaust manifold is segmented, it may be determined which cylinders are grouped to a common exhaust manifold segment such that they discharge exhaust through a common conduit. Herein, the first cylinder undergoing the late combustion and the second cylinder receiving the exhaust residuals may be coupled to the common exhaust manifold, even if located at different positions on the engine.

In still other embodiments, the controller may determine which cylinder is likely to receive the exhaust residuals by utilizing the one or more knock sensors coupled along the engine block to detect if an exhaust valve has been forced open. In particular, after an exhaust valve of a neighboring cylinder is forced open at high pressure, the exhaust valve slams into the exhaust seat upon return. This slamming occurs because the exhaust valve is on the base circle of the camshaft, and is not following the exhaust cam profile for that particular cylinder in the bank of cylinders. When the slamming occurs it generates vibrations which cause the knock sensors to resonate. By knowing which cylinder on the bank recently fired (late), and which exhaust valves on the bank of cylinders are on the base circle, it is possible for the controller to window where the vibration occurred. This information along with the sensor output properly filtered in the correct frequency spectrum enables the controller to identify which cylinder received the unintended hot residual. Additionally, air mass flow rates could be used to know when the engine was at high enough loads to produce pressures high enough to unseat the exhaust valves from the corresponding late burns. In one example, in response to a sensed block vibration in a window during an open exhaust valve of a first cylinder undergoing a late combustion event and after exhaust valve closing of a second cylinder, the controller may infer that the second cylinder received unintended hot residuals from the first cylinder.

At 520, upon identifying a second cylinder receiving unintended hot residuals from a first late burning cylinder, the method includes determining an amount and temperature of residuals received in the affected cylinder based on the sampled exhaust pressure and valve timing. In the case of a first misfiring cylinder, the misfiring cylinder may pre-ignite on its next combustion event due to having a different amount of residuals in the cylinder due to the misfire, or possibly from a different (e.g., lower) amount of residuals in an adjacent cylinder. Even if there is no pre-ignition, the adjacent cylinders of the misfiring cylinder may knock due to lower amount of residuals (and therefore the spark timing for those cylinders may be advanced of the location necessary at the higher residual level). For example, based on the instantaneous exhaust pressure in the second cylinder at the time of the forced opening of the exhaust valve, as well as the instantaneous exhaust pressure in the first cylinder from which the residuals are released, the controller may accurately determine an amount and temperature of residuals received in the second cylinder. Alternatively, the amount and temperature of residuals received may be inferred based on exhaust manifold pressure relative to MAP. In addition, an internal EGR estimate for the second cylinder the hot residuals may be updated based on the amount and temperature of residuals received from the first cylinder relative to the amount and temperature of residuals generated in the second cylinder.

In some embodiments, one or more cylinders that will be progressively affected by the residuals generated in the first cylinder may be identified. For example, in addition to identifying a second cylinder receiving (or most likely to receive) exhaust residuals from the first cylinder, a third cylinder likely to receive residuals from the second cylinder may also be identified based on the sampled exhaust pressure. This is because the hot residuals received in the second cylinder may not only cause the second cylinder to potentially pre-ignite, but the received hot residuals may also lead to elevated exhaust temperatures upon combustion in the second cylinder, which can force hot residuals into the third cylinder and increase the third cylinder's propensity for pre-ignition. Thus, based on the instantaneous and peak pressures of the first and second cylinders, and further based on a timing of cylinder valve events, an amount and temperature of residuals received in the affected cylinders may be determined.

At 522, the method includes adjusting fueling to the affected cylinder(s) based on the amount and temperature of residuals received. In particular, upon identifying the second cylinder, the routine includes performing a pre-ignition mitigating action in the second cylinder receiving the exhaust residuals from the first cylinder (e.g., by adjusting fuel injection to the second cylinder). For example, based on the amount and temperature of residuals received, the controller may determine whether to enrich the affected cylinder (s) or whether to selectively deactivate spark ignition and/or fuel injection to the affected cylinder(s). As an example, the engine controller may selectively deactivate fuel injection and not deactivate spark, with spark continuing without fuel injection in the second cylinder. As another example, the engine controller may selectively deactivate fuel injection and spark to the second cylinder. As yet another example, the engine controller may selectively enrich fuel to the second cylinder with spark continuing.

Further still, adjusting the fueling may include adjusting a split ratio of fuel delivered to a cylinder as an intake stroke injection relative to a compression stroke injection over a combustion event. For example, the amount of fuel delivered in the compression stroke injection may be decreased. This includes ceasing the compression stroke injection. As another example, the amount of fuel delivered in the intake stroke injection may be decreased. Further still, based on a degree of lateness of a late combustion, the compression stroke injection may be stopped while maintaining the intake stroke injection. As elaborated with reference to FIG. 6, based on a duration between the detection of a late burn in a first firing cylinder and the commanding of a fuel pulse to a second cylinder receiving the residuals, the fueling of the second cylinder may be adjusted. Thus, if there is sufficient time, at least the compression injection may be ceased and if possible, both the intake and compression stroke injections may be ceased. Else, only the compression stroke injection (or the latest of multiple injections for the given combustion event) may be ceased.

The selection may be based on the amount and temperature of residuals released from the first cylinder late-burning cylinder and optionally further based on the propensity for pre-ignition of the second (or third and so forth) cylinder receiving the exhaust residuals. As an example, in response to a temperature of the residuals being lower than a threshold temperature, the controller may enrich the cylinder receiving the residuals, the degree of richness increased as the amount of residuals increases. In another example, in response to the temperature of the residuals being higher than the threshold temperature, the controller may selectively deactivate spark and fuel to the cylinder receiving the residuals.

In another example, in response to an amount of residuals (and/or a temperature of residuals) released from the first cylinder being larger than a threshold amount, the controller may selectively deactivate each of spark ignition and fuel to a second cylinder receiving exhaust residuals from the combustion in the first cylinder. In comparison, in response to the amount of residuals (and/or a temperature of residuals) released from the first cylinder being smaller than the threshold amount, the controller may selectively deactivate only fuel or only spark to the second cylinder.

In some examples, if the fuel pulse of an adjacent cylinder has already started, it may not be possible to completely cease fueling. In such cases, an intake stroke fuel injection may be continued while a compression stroke fuel injection is ceased. Thus, for example, in response to combustion timing of a late combustion being delayed by more than a threshold amount, a compression stroke fuel injection may be ceased while the intake stroke injection is maintained.

Spark and/or fuel injection may then be reactivated during subsequent combustion events. That is, spark and/or fuel injection may be selectively deactivated to the second cylinder for only one combustion cycle. Likewise, the enrichment may be performed for a predetermined duration (e.g., one combustion event) and then stoichiometric cylinder combustion may be resumed.

In parallel, at 524, the method includes updating an internal EGR estimate for the misfiring/late-burning first cylinder based on the amount and temperature of residuals generated in the cylinder relative to the amount and temperature of residuals released from the first cylinder. At 526, as at 512, one or more operating parameters are adjusted. In particular, one or more parameters that may be affected by a change in the internal EGR estimate may be adjusted. Therein the controller may update one or more of an engine external EGR estimate, spark timing, rate of change of spark timing, and engine fueling based on the updated internal EGR estimate. As non-limiting examples, in response to decrease in cylinder internal EGR (due to release of residuals from the first cylinder), an engine external EGR amount may be increased (e.g., by decreasing the opening of an EGR valve), spark timing may be adjusted so that spark advance is retarded relative to the spark advance applied in the presence of a higher residual amount, spark energy may be decreased if the engine dilution is lower than a threshold by decreasing an ignition coil dwell time, and cylinder fueling may be adjusted (e.g., increased if more air enters the cylinder when EGR is reduced), if required, to maintain a stoichiometric air-fuel ratio (e.g., the cylinder may be operated leaner than stoichiometry).

By performing a pre-ignition mitigating action in the second cylinder, various advantages are achieved. First, the selective spark and/or fuel deactivation is performed to reduce pre-ignition in the second cylinder. In addition, pre-ignition is mitigated in a third cylinder that might have received exhaust residuals from the second cylinder.

In some embodiments, in addition to performing the pre-ignition mitigating action in the second cylinder, a pre-ignition mitigating action may also be performed in the third cylinder. As one example, in response to the amount and/or temperature of residuals released from the first cylinder (as based on the estimated exhaust pressure) being larger than a threshold amount, the engine controller may selectively deactivate spark and/or fuel injection to the second cylinder receiving exhaust residuals from the first cylinder as well as selectively deactivating spark and/or fuel injection to the third cylinder expected to receive exhaust residuals from the second cylinder. As another example, the engine controller may selectively deactivate spark and fuel injection to the second cylinder receiving exhaust residuals from the first cylinder as well as selectively deactivating fuel injection (with or without deactivating spark) to the third cylinder expected to receive exhaust residuals from the second cylinder. As such, the pre-ignition mitigating action is performed before receiving an indication of pre-ignition in each of the first, second, and third cylinders. Spark and/or fuel may then be reactivated at the subsequent combustion event. For example, spark and/or fueling may be reactivated at a combustion event in a fourth cylinder firing after the third cylinder. As another example, if n cylinders have spark and/or fuel deactivated, spark and fuel may be reactivated at the n+1th combustion event.

In the depicted embodiment, the controller may continuously monitor misfire and late combustion events in all engine cylinders under all conditions and perform mitigating actions in response to any cylinder late combustion event or misfire. In alternate embodiments, the controller may only perform the pre-ignition mitigating actions (e.g., deactivating spark and fuel injection) when engine load is over a threshold, thereby indicating a risk for pre-ignition. In still other embodiments, the controller may look at late combustion events or misfire events in high air mass flow regions where the exhaust manifold volume comes more into play.

Further still, in some embodiments, after inferring which cylinder (the recipient cylinder) is receiving exhaust residuals from the late burn event in the first cylinder (the donor cylinder), the controller may first determine if the likelihood of pre-ignition in the recipient cylinder is higher than a threshold. The likelihood of pre-ignition may be based on the recipient cylinder's pre-ignition history and parameters of combustion in the donor cylinder (such as combustion air-fuel ratio, timing of combustion, in-cylinder combustion temperature and pressure, expected temperature and air-fuel ratio of exhaust residuals, mass of unburned fuel remaining in the donor cylinder, mass of unburned fuel likely to be ingested into the recipient cylinder, etc.). If the likelihood of pre-ignition is determined to be higher, the engine controller may deactivate fuel and spark to the recipient cylinder. Else, the controller may deactivate only one of spark and fuel to the recipient cylinder.

As such, the exhaust residuals received may be richer or leaner than stoichiometry. For example, during misfire events, an exhaust oxygen sensor may read lean if there is a misfire/partial burn due to the presence of excess oxygen in the exhaust that was not consumed during the combustion process. However, the presence of unburned fuel in the donor cylinder generates a combustion mixture with high temperatures which when ingested in the recipient cylinder, can have the effect of a hot intake aircharge.

In this way, by adjusting spark timing and fuel injection to one or more cylinders receiving, directly or indirectly, a large amount of hot exhaust residuals from a late combustion event in a neighboring cylinder, late burn induced pre-ignition events may be better anticipated and mitigated. By relying on an exhaust pressure profile sampled over a cylinder exhaust valve event to estimate an amount of residuals generated and/or received in each engine cylinder, the forced opening of an exhaust valve due to residuals released from a misfiring/late-burning cylinder may be more accurately identified. In addition, a degree of unintended hot residuals received in an engine cylinder may be reliably determined, allowing for a more accurate pre-ignition mitigating action to be performed.

Figure 6:
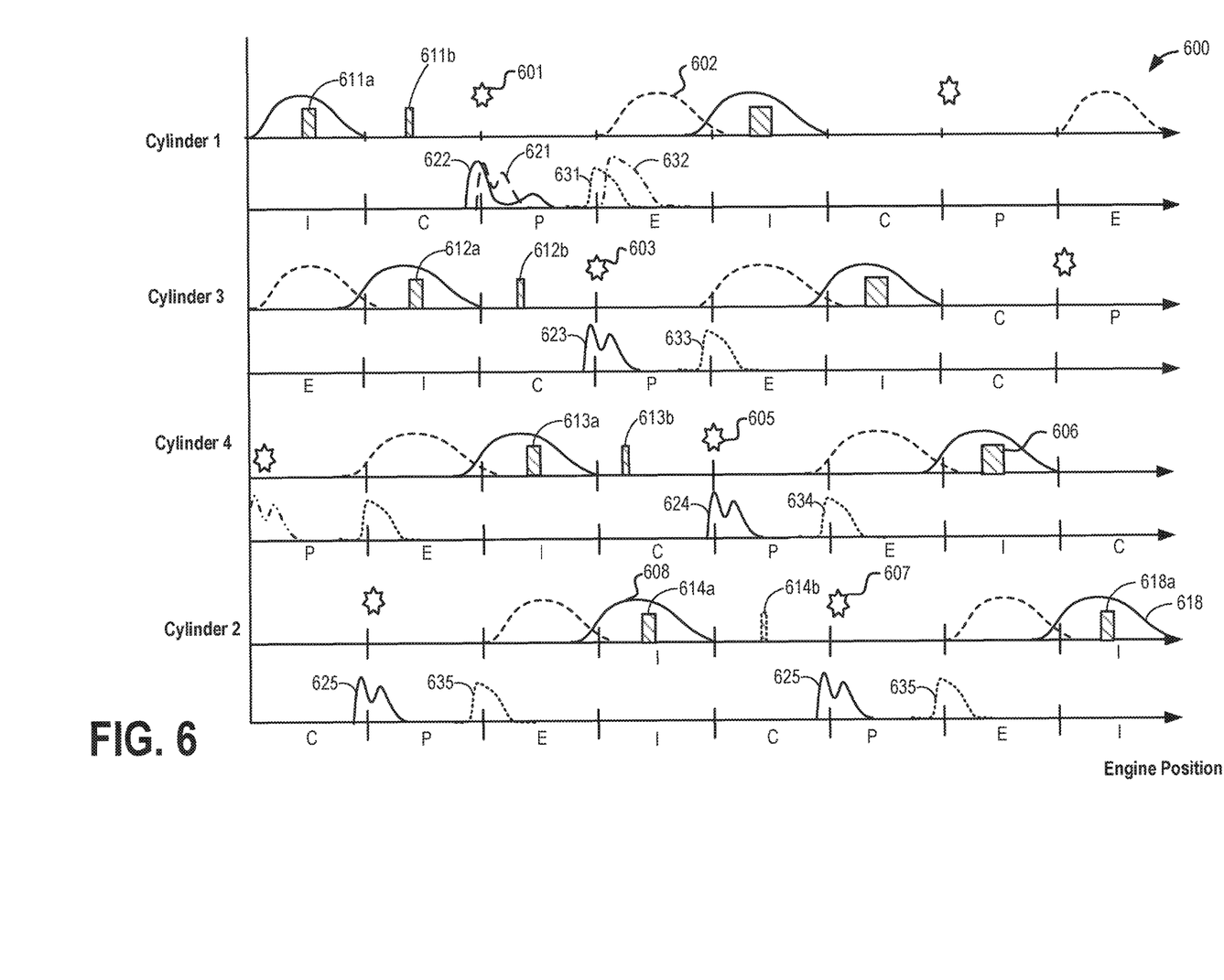
FIG. 6 shows an example identification of exhaust valve opening in a neighboring cylinder due to residuals received from a late burning or misfiring cylinder, and example adjustments to spark timing and fuel injection in accordance with the present disclosure.

FIG. 6 shows an example engine spark timing and fuel injection adjustment performed in response to a cylinder misfire or late combustion event. Specifically, FIG. 6 shows an example of deactivating fuel injection to a second cylinder receiving exhaust residuals from a first cylinder which experienced misfire or late combustion.

Turning to FIG. 6, map 600 shows a four cylinder in-line engine having cylinders 1-4 arranged consecutively along an engine block (not shown), wherein cylinders 1-4 are configured to fire in the order 1-3-4-2. Map 600 depicts intake valve timings (solid line) and exhaust valve timings (longer dashed line) with respect to engine piston position being in an intake stroke (I), exhaust stroke (E), power stroke (P) or compression stroke (C). Map 600 further depicts cylinder spark ignition events by stars 601, 603, 605, 607 and cylinder fuel injection events by rectangles 611a-b, 612a-b, 613a-b, and 614a-b. Further, map 600 depicts in-cylinder pressure profiles for the cylinders as traces 621, 622, 623, 624, 625. Exhaust pressure profiles for the cylinders are depicted by traces 631, 632, 633, 634, and 635.

The first plot from the top of the figure represents position of cylinder number one (cylinder 1). And, in particular, the stroke of cylinder number one as the engine crankshaft is rotated. Cylinder 1 strokes are labeled according to the engine position. For example, cylinder 1 is shown first in an intake stroke (I), the engine rotates and cylinder number one enters the compression stroke (C) followed by power (P) and exhaust (E) strokes. The cylinder cycle for cylinder 1 then repeats. For a four stroke engine a cylinder cycle may be 720°, the same crankshaft interval for a complete cycle of the engine.

The second plot from the top of the figure, likewise represents position of cylinder number three (cylinder 3), in particular, the stroke of cylinder number three as the engine crankshaft is rotated. Cylinder 3 strokes are labeled according to the engine position. For example, Cylinder 3 is shown first in an exhaust stroke (E), the engine rotates and cylinder number three enters the intake stroke (I), followed by compression (C) and power (P) strokes. The cylinder cycle for Cylinder 3 then repeats. The third plot from the top of the figure, likewise represents position of cylinder number four (cylinder 4), in particular, the stroke of cylinder number four as the engine crankshaft is rotated. Cylinder 4 strokes are labeled according to the engine position. For example, Cylinder 4 is shown first in power stroke (P), the engine rotates and cylinder number four enters the exhaust stroke (E), followed by intake (I) and compression (C) strokes. The cylinder cycle for Cylinder 4 then repeats. The fourth plot from the top of the figure, likewise represents position of cylinder number two (Cylinder 2), in particular, the stroke of cylinder number two as the engine crankshaft is rotated. Cylinder 2 strokes are labeled according to the engine position. For example, Cylinder 2 is shown first in a compression stroke (C), the engine rotates and cylinder number two enters the power stroke (P), followed by exhaust (E) and intake (I) strokes. The cylinder cycle for Cylinder 2 then repeats.

The star at label 601 indicates the ignition event for a first combustion event in cylinder 1. The ignition may be initiated by a spark plug. In this sequence, cylinder number one valves are open for at least a portion of the intake stroke to provide air to the cylinder. Fuel may be injected to the engine cylinders by port or direct injectors as a first intake stroke injection 611a and a second compression stroke injection 611b. The fuel and air mixture are compressed and ignited during the compression stroke. Peak cylinder pressure may occur at top-dead-center of compression stroke or during the expansion stoke. Subsequent combustion events in cylinders 3, 4, and 2 are shown at 603, 605, and 607, in that order.

In the depicted example, the combustion event in cylinder 1 is delayed more than expected, resulting in a late burn. In particular, combustion is desired according to in-cylinder pressure profile 621. However, the late combustion event results in combustion occurring according to in-cylinder pressure profile 622. As a result of the late combustion event, the actual exhaust pressure profile includes a larger and later exhaust pulse 632 instead of the desired smaller and earlier exhaust pulse 631.

As a result of the late combustion event, a large amount of hot exhaust residuals are discharged from Cylinder 1 during the exhaust stroke when the exhaust valve opens (plot 602). Due to the configuration of the engine, cylinder number two (Cylinder 2) is in an intake stroke (plot 608) at the same time as Cylinder 1 is in exhaust stroke (plot 602), providing relatively less resistance to the entry of residuals. In comparison, cylinder number three (Cylinder 3) and cylinder number four (Cylinder 4) are in power and compression strokes respectively at the same time as Cylinder 1 is in the exhaust stroke, providing relatively more resistance to the entry of residuals. As a result, the hot exhaust residuals generated from the late combustion event in Cylinder 1 are most likely to be received in Cylinder 2, potentially increasing the propensity for Cylinder 2 to pre-ignite. As such, since neither of cylinder numbers three and four (Cylinder 3, Cylinder 4) are likely to receive exhaust residuals from the late combustion event in Cylinder 1, neither is likely to be affected by the late combustion event.

The engine controller may determine the cylinder (herein cylinder 2) most likely to receive the exhaust residuals based on the sampled exhaust pressure profile 632 of late burning cylinder 1. In other examples, the forcing open of the exhaust valve of cylinder 2 may be confirmed based on detecting the characteristic mechanical noise after the exhaust valve slams shuts upon returning to the exhaust valve seat, as discussed above. In still further embodiments, air mass flow rates can be additionally used to determine when the engine was at high enough loads to produce pressures high enough to unseat the exhaust valves of neighboring cylinder from the corresponding late burns.

In response to late combustion and/or misfire in Cylinder 1 and to reduce the likelihood of pre-ignition in Cylinder 2, fuel injection during the compression stroke of Cylinder 2 is deactivated. In particular, fuel that would have been injected as injection 614b is not delivered. Herein, the intake stroke fuel injection 614a of cylinder 2 is continued while the compression stroke fuel injection 614b of cylinder 2 is ceased due to there being insufficient time between the detection of a late burn in cylinder 1 and the commanding of the intake fuel pulse of cylinder 2, but there being sufficient time between the detection of a late burn in cylinder 1 and the commanding of the compression fuel pulse of cylinder 2. In alternate examples, both the intake and the compression stroke fuel pulses to cylinder 2 may be cased, if possible, such that no fuel is injected into Cylinder 2. However, spark may not be deactivated (as shown by the star 607) since the richness of the exhaust residuals may not be greater than a threshold. For example, the fuel injection at 611*a-b* may result in an exhaust air-fuel ratio at or close to stoichiometry. As such, residual fuel may not enter Cylinder 2 and cause pre-ignition. Compression stroke fuel injection is then reactivated during the following intake stroke (plot 618*a*) in Cylinder 2.

However, in other examples, the engine controller may also deactivate the spark at 607 in order to reduce the likelihood of pre-ignition in Cylinder 2. For example, no spark may occur during the power stroke following the intake stroke in Cylinder 2.

One example method for an engine comprises: indicating imminent pre-ignition in a cylinder responsive to an amount of residuals received or generated in the cylinder, the amount of residuals based on an exhaust pressure and an intake manifold pressure; and adjusting fueling of the cylinder based on the indication and further based on the amount of residuals. In the preceding example, additionally or optionally, the amount of residuals is based on the exhaust pressure relative to the intake manifold pressure, the amount of residuals increased as the exhaust pressure exceeds the intake manifold pressure. In any or all of the preceding examples, additionally or optionally, the exhaust pressure is estimated by a pressure sensor coupled to an exhaust port of the cylinder over an exhaust valve event, or coupled to a common exhaust manifold. In any or all of the preceding examples, additionally or optionally, the indicating includes comparing a force generated by the amount of residuals at the cylinder relative to a force holding an exhaust valve seat of the cylinder closed; and indicating imminent pre-ignition when the force generated by the amount of residuals is larger than the force holding the exhaust valve seat of the cylinder closed. In any or all of the preceding examples, additionally or optionally, indicating imminent pre-ignition includes indicating pre-ignition may occur in the cylinder before an actual incidence of pre-ignition in the cylinder. In any or all of the preceding examples, additionally or optionally, the method further comprises based on valve timing, determining whether the amount of residuals are released from the cylinder. In any or all of the preceding examples, additionally or optionally, the cylinder is a first cylinder, and the method further comprises based on valve timing, identifying a second cylinder receiving the amount of residuals from the cylinder. In any or all of the preceding examples, additionally or optionally, the method further comprises adjusting fueling of the cylinder based on a temperature of the amount of residuals. In any or all of the preceding examples, additionally or optionally, the adjusting includes, when the temperature of the amount of residuals is lower than a threshold, enriching the cylinder; and when the temperature of the amount of residuals is higher than the threshold, disabling fuel to the cylinder, or ceasing a compression stroke injection while maintaining an intake stroke injection of the cylinder. In any or all of the preceding examples, additionally or optionally, the method further comprises updating an estimate of internal EGR in the cylinder based on the estimated amount of residuals. In any or all of the preceding examples, additionally or optionally, the method further comprises, adjusting one or more of cylinder valve timing, cylinder spark timing, and an engine external EGR amount based on the updated estimate of internal EGR in the cylinder.

Another example method for an engine comprises: estimating an amount and temperature of exhaust residuals generated in a first cylinder based on exhaust pressure reading changes relative to intake manifold pressure readings over a valve event of the first cylinder; and adjusting fueling of a second cylinder based on the estimated amount and temperature of the residuals generated in the first cylinder. In the preceding example, additionally or optionally, the second cylinder receives at least a portion of exhaust residuals from combustion in the first cylinder. In any or all of the preceding examples, additionally or optionally, the adjusting includes in response to the amount of residuals in the first cylinder being lower than a threshold amount and a temperature of the residuals being lower than a threshold temperature, enriching the second cylinder; in response to the amount of residuals in the first cylinder being lower than the threshold amount and the temperature of the residuals being higher than the threshold temperature, selectively deactivating spark ignition or fuel to the second cylinder; and in response to the amount of residuals in the first cylinder being higher than the threshold amount, selectively deactivating spark ignition and fuel to the second cylinder, wherein selectively deactivating fuel includes selectively deactivating delivery of fuel in at least a compression stroke to the second cylinder. In any or all of the preceding examples, additionally or optionally, the method further comprises estimating the portion of residuals received in the second cylinder from the first cylinder based on valve timing and further based on exhaust pressure reading changes over a valve event of the second cylinder, and increasing a degree of richness of the enriching as the portion increases. In any or all of the preceding examples, additionally or optionally, the method further comprises identifying the second cylinder based on the amount and temperature of residuals generated in the first cylinder and further based on valve timing. In any or all of the preceding examples, additionally or optionally, the method further comprises adjusting one or more of fueling, spark timing, and spark energy of the first cylinder based on the estimated amount and temperature of the residuals.

Another example engine system comprises: an engine including a first and second cylinder; a spark plug coupled to each engine cylinder; a direct fuel injector coupled to each engine cylinder; a pressure sensor coupled to an exhaust port of each cylinder for estimating an exhaust pressure; and a controller. The controller is configured with computer readable instructions on non-transitory memory for: sampling an exhaust pressure of the first cylinder during a first cylinder exhaust valve event and of the second cylinder during a second cylinder exhaust valve event; estimating an amount and temperature of residuals generated and released from the first cylinder based on the sampled exhaust pressure for the first cylinder; estimating an amount and temperature of residuals received in a second cylinder from the first cylinder based on the sampled exhaust pressure for the first cylinder and the sampled exhaust pressure for the second cylinder; and adjusting fueling of the second cylinder based on the estimated amount and temperature of residuals received in the second cylinder. In the preceding example, additionally or optionally, the adjusting includes selectively deactivating fuel and spark to the second cylinder in response to one of the estimated amount being higher than a threshold amount and the estimated temperature being higher than a threshold temperature, and selectively enriching the second cylinder in response to each of the estimated amount being lower than the threshold amount and the estimated temperature being lower than the threshold temperature. In any or all of the preceding examples, additionally or optionally, the second cylinder is selected based on valve timing, an identity of the first cylinder, and a firing order of the engine. In any or all of the preceding examples, the adjusting includes adjusting a split ratio of fuel delivered to the second cylinder via intake stroke injection relative to compression stroke injection, the split ratio adjusted to cease fuel delivered during the compression stroke injection.

In this way, estimated individual cylinder exhaust pressure pulses may be relied on to accurately estimate an amount of exhaust residuals generated and released from each engine cylinder. The higher signal to noise ratio of the estimated exhaust pressure profiles for each cylinder may then be used to accurately identify cylinder misfire events and late burn events that have the potential for filling the exhaust manifold with hot residuals. In addition, the estimated exhaust pressure profiles can be advantageously leveraged to identify the forced opening of a cylinder valve and the unintended ingestion of exhaust residuals from a misfiring or late-burning cylinder into a neighboring cylinder. By adjusting a pre-ignition mitigating adjustment performed in the affected cylinder based on the amount and temperature of the received residuals, late-burn/misfire induced pre-ignition may be better addressed. This allows engine degradation due to pre-ignition to be mitigated. By also using the exhaust pressure profile to update the internal EGR estimate for each cylinder, engine operating parameters may be more accurately controlled and engine performance may be improved.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   indicating imminent pre-ignition in a cylinder responsive to an amount of residuals received or generated in the cylinder, the amount of residuals based on a peak exhaust pressure amount and timing, and an intake manifold pressure; and
   adjusting fueling of the cylinder based on the indication and further based on the amount of residuals.

2. The method of claim 1, wherein the amount of residuals is based on the exhaust pressure amount relative to the intake manifold pressure as well as the peak exhaust pressure amount and timing, the amount of residuals increased as the exhaust pressure amount exceeds the intake manifold pressure, the amount of residuals further based on an exhaust pressure profile over an exhaust valve event.

3. The method of claim 1, wherein the exhaust pressure amount is estimated by a pressure sensor coupled to an exhaust port of the cylinder over an exhaust valve event.

4. The method of claim 1, wherein the indicating includes:
   comparing a force generated by the amount of residuals at the cylinder relative to a force holding an exhaust valve seat of the cylinder closed; and
   indicating imminent pre-ignition when the force generated by the amount of residuals is larger than the force holding the exhaust valve seat of the cylinder closed.

5. The method of claim 1, wherein indicating imminent pre-ignition includes indicating pre-ignition may occur in the cylinder before an actual incidence of pre-ignition in the cylinder.

6. The method of claim 1, further comprising, based on valve timing, determining whether the amount of residuals is released from the cylinder.

7. The method of claim 6, wherein the cylinder is a first cylinder, the method further comprising, based on the valve timing, identifying a second cylinder receiving the amount of residuals from the cylinder.

8. The method of claim 1, further comprising adjusting fueling of the cylinder based on a temperature of the amount of residuals.

9. The method of claim 8, wherein the adjusting includes, when the temperature of the amount of residuals is lower than a threshold, enriching the cylinder; and when the temperature of the amount of residuals is higher than the threshold, disabling fuel to the cylinder or ceasing a compression stroke injection while maintaining an intake stroke injection of the cylinder.

10. The method of claim 1, further comprising updating an estimate of internal EGR in the cylinder based on the amount of residuals.

11. The method of claim 10, further comprising adjusting one or more of cylinder valve timing, cylinder spark timing, and an engine external EGR amount based on the updated estimate of internal EGR in the cylinder.

12. A method for an engine, comprising:
   estimating an amount and temperature of exhaust residuals generated in a first cylinder based on exhaust pressure reading changes relative to intake manifold pressure readings over an exhaust valve event of the first cylinder, including by estimating exhaust pressure pulsations in each cylinder based on an amount and timing of a peak exhaust pressure during the exhaust valve event; and adjusting fueling of a second cylinder based on the estimated amount and temperature of the residuals generated in the first cylinder.

13. The method of claim 12, wherein the second cylinder receives at least a portion of exhaust residuals from combustion in the first cylinder.

14. The method of claim 13, wherein the adjusting includes:

in response to the amount of residuals in the first cylinder being lower than a threshold amount and the temperature of the residuals being lower than a threshold temperature, enriching the second cylinder;

in response to the amount of residuals in the first cylinder being lower than the threshold amount and the temperature of the residuals being higher than the threshold temperature, selectively deactivating spark ignition or fuel to the second cylinder; and in response to the amount of residuals in the first cylinder being higher than the threshold amount, selectively deactivating spark ignition and fuel to the second cylinder, wherein selectively deactivating fuel includes selectively deactivating delivery of fuel in at least a compression stroke to the second cylinder.

15. The method of claim 14, further comprising estimating the portion of exhaust residuals received in the second cylinder from the first cylinder based on valve timing and further based on exhaust pressure reading changes over a valve event of the second cylinder, and increasing a degree of richness of the enriching as the portion increases.

16. The method of claim 13, further comprising identifying the second cylinder based on the amount and temperature of exhaust residuals generated in the first cylinder and further based on valve timing.

17. The method of claim 12, further comprising adjusting one or more of fueling, spark timing, and spark energy of the first cylinder based on the estimated amount and temperature of the exhaust residuals.

18. the method of claim 12, further comprising estimating exhaust pressure pulsations in each cylinder based on instantaneous and peak exhaust pressure over the exhaust valve event, rather than an average exhaust pressure.

\* \* \* \* \*